(12) United States Patent
Zimmer et al.

(10) Patent No.: US 7,227,551 B2
(45) Date of Patent: Jun. 5, 2007

(54) MANIPULATING TEXT AND GRAPHIC APPEARANCE

(75) Inventors: Mark Zimmer, Aptos, CA (US); Kok Chen, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 223 days.

(21) Appl. No.: 11/021,358

(22) Filed: Dec. 23, 2004

(65) Prior Publication Data

US 2006/0139369 A1 Jun. 29, 2006

(51) Int. Cl.
*G06T 17/00* (2006.01)
*G09G 5/00* (2006.01)
*G06K 9/40* (2006.01)
*G06K 9/36* (2006.01)
G06K 9/20 (2006.01)
G06K 9/68 (2006.01)
G06T 11/00 (2006.01)

(52) U.S. Cl. .............. 345/586; 345/428; 345/606; 345/643; 345/592; 382/283; 382/254; 382/218

(58) Field of Classification Search .......... 345/421, 345/428, 586, 588, 606, 611, 628, 643, 592, 345/467–468, 469.1; 382/254–256, 283, 382/264, 266, 300, 171–172, 176, 218, 260

See application file for complete search history.

(56) References Cited

U.S. PATENT DOCUMENTS

| | | | |
|---|---|---|---|
| 5,388,201 A | 2/1995 | Hourvitz et al. | 345/794 |
| 5,490,246 A | 2/1996 | Brotsky et al. | 395/161 |
| 5,774,133 A * | 6/1998 | Neave et al. | 345/505 |
| 5,793,376 A | 8/1998 | Tanaka et al. | 345/582 |
| 5,933,148 A | 8/1999 | Oka et al. | 345/427 |
| 5,949,409 A | 9/1999 | Tanaka et al. | 345/549 |
| 6,006,231 A | 12/1999 | Popa | 707/101 |
| 6,031,937 A | 2/2000 | Graffagnino | 382/236 |
| 6,075,543 A | 6/2000 | Akeley | 345/539 |
| 6,166,748 A | 12/2000 | Van Hook et al. | 345/522 |
| 6,211,890 B1 | 4/2001 | Ohba | 345/506 |
| 6,246,418 B1 | 6/2001 | Oka | 345/441 |
| 6,272,558 B1 | 8/2001 | Hui et al. | 709/328 |
| 6,369,823 B2 | 4/2002 | Ohba | 345/506 |
| 6,369,830 B1 | 4/2002 | Brunner et al. | 345/629 |
| 6,411,301 B1 | 6/2002 | Parikh et al. | 345/522 |
| 6,421,058 B2 | 7/2002 | Parikh et al. | 345/522 |
| 6,424,348 B2 | 7/2002 | Parikh | 345/522 |

(Continued)

FOREIGN PATENT DOCUMENTS

EP 548 586 A 6/1993

(Continued)

OTHER PUBLICATIONS

International Search report dated Jul. 27, 2005 (PCT/US 05/008804; 119-0033WO).

(Continued)

*Primary Examiner*—Wesner Sajous
(74) *Attorney, Agent, or Firm*—Wong, Cabello, Lutsch, Rutherford & Brucculeri LLP

(57) ABSTRACT

A method, device and computer system for creating a smooth, continuous height (scalar or vector) field are described. The described techniques permit arbitrary closed regions to be smoothly shaded without producing unnatural smoothness at the region's edges or boundaries.

99 Claims, 3 Drawing Sheets

U.S. PATENT DOCUMENTS

| | | | |
|---|---|---|---|
| 6,452,600 B1 | 9/2002 | Parikh et al. | 345/522 |
| 6,456,290 B2 | 9/2002 | Parikh et al. | 345/522 |
| 6,466,218 B2 | 10/2002 | Parikh et al. | 345/522 |
| 6,489,963 B2 | 12/2002 | Parikh et al. | 345/522 |
| 6,526,174 B1 | 2/2003 | Graffagnino | 382/236 |
| 6,571,328 B2 | 5/2003 | Liao et al. | 712/35 |
| 6,577,317 B1 | 6/2003 | Duluk, Jr. et al. | 345/506 |
| 6,580,430 B1 | 6/2003 | Hollis et al. | 345/473 |
| 6,609,977 B1 | 8/2003 | Shimizu et al. | 463/36 |
| 6,614,444 B1 | 9/2003 | Duluk, Jr. et al. | 345/581 |
| 6,618,048 B1 | 9/2003 | Leather | 345/422 |
| 6,636,214 B1 | 10/2003 | Leather et al. | 345/422 |
| 6,639,595 B1 | 10/2003 | Drebin et al. | 345/426 |
| 6,664,958 B1 | 12/2003 | Leather et al. | 345/422 |
| 6,664,962 B1 | 12/2003 | Komsthoeft et al. | 345/426 |
| 6,697,074 B2 | 2/2004 | Parikh et al. | 345/522 |
| 6,707,462 B1 | 3/2004 | Peercy et al. | 345/619 |
| 6,717,599 B1 | 4/2004 | Olano | 345/853 |
| 2002/0093516 A1 | 7/2002 | Brunner et al. | 345/629 |
| 2002/0118217 A1 | 8/2002 | Fujiki | |
| 2002/0123739 A1 | 9/2002 | Graffagnino | 382/236 |
| 2002/0174181 A1 | 11/2002 | Wei | 709/204 |
| 2003/0086486 A1* | 5/2003 | Graziano et al. | 375/222 |
| 2003/0101206 A1* | 5/2003 | Graziano et al. | 708/277 |
| 2003/0174136 A1 | 9/2003 | Emberling et al. | |

FOREIGN PATENT DOCUMENTS

| | | |
|---|---|---|
| EP | 0 694 879 | 1/1996 |
| EP | 1 383 080 | 1/2004 |
| EP | 0 972 273 B1 | 3/2004 |
| WO | WO 98/45815 | 10/1998 |
| WO | WO 02/09039 A | 1/2002 |
| WO | WO 2004-027707 A2 | 4/2004 |

OTHER PUBLICATIONS

International Search report dated Aug. 8, 2005 (PCT/US 05/008805; 119-0034WO).

Haeberli, P. et al., "The Accumulation Buffer: Hardware Support for High-Quality Rendering," Computer Graphics, New York, NY, vol. 24, No. 4, Aug. 1, 1990, pp. 309-318.

nVidia, "Cg—Teaching Cg" Power Point Presentation, Author and date unknown.

Shantzis, "A Model for Efficient and Flexible Image Computing" Computer Graphics Proceedings, Annual Conference Series, 1994, pp. 147-154.

Akeley, et al., "Real-Time Graphics Architecture" http://www.graphics.stanford.edu/courses/cs448a-01-fall, The OpenGL® Graphics System—CS448 Lecture 15, Fall 2001, pp. 1-20.

Gelder, et al., "Direct Volume Rendering with Shading via Three-Dimensional Textures" Computer Science Dept., Univ. of California, Santa Cruz, CA 95064.

Elliott, "Programming Graphics Processors Funcionally,".

Segal, et al., "The OpenGL® Graphics System: A Specification (Version 1.5)" Copyright© 1992-2003 Silicon Graphics, Inc., Oct. 30, 2003.

* cited by examiner

MANIPULATING TEXT AND GRAPHIC APPEARANCE

BACKGROUND

The invention relates generally to computer graphics and more particularly to the generation of spatially varying effects applied to an arbitrary graphic region (e.g., highlighting, blurring, vertical rise, shading, lighting effects and the like).

Graphic artists often spend a significant amount of time generating spatially varying effects for a specified region such as a character, a string of characters or a graphic object or image. In one approach graphic artists apply a shading via an airbrush and then mask the resulting image so as to conform it to the prescribed region—repeating as needed to obtain the desired visual effect. While such techniques can be used to generate visually stunning effects, they typically require large amounts of time and/or a large degree of artistic ability. Thus, it would be beneficial to provide a mechanism to rapidly and, to a large degree automatically, generate spatially varying effects for arbitrarily defined regions.

SUMMARY

The invention provides a method and system to generate modified digital representations of arbitrary regions. The method includes receiving a mask, constraint values and initial condition values. The mask defines one or more inside regions, one or more outside regions and one or more boundaries. A mask could, for example, define a single character, a plurality of characters such as a word or an arbitrary image. The constraints specify values that are retained in the modified (and final) representation and correspond to the mask's outside and boundary regions. The initial conditions specify the initial or starting values of an image and correspond to the mask's inside and boundary regions.

The initial values and constraints are combined in a temporary buffer using the mask and blurred in accordance with a specified filter (e.g., a Gaussian filter) using an initial blur radius. Once combined, the blur radius is reduced and the constraints are enforced—those temporary buffer elements corresponding to the outside regions are set to their corresponding constraint value while those temporary buffer elements corresponding to the boundary regions are set to a value between their combined value and the corresponding constraint value (e.g., interpolated). The operations of blurring, reducing the blur radius and applying the constraints are repeated until the blur radius drops below a specified value (e.g., a value corresponding to a single pixel). Once complete, temporary buffer values corresponding to the inside and boundary regions represent the modified graphical image.

In other embodiments, other low pass filtering may be used instead of conventional blurring filters. In these embodiments, the initial blur radius corresponds to an initial cut-off frequency. During each iteration of the method, the cut-off frequency is increased by a specified amount until it reaches or exceeds some threshold frequency such as, for example, the frequency of the pixel grid.

Methods in accordance with the invention may be stored in any media that is readable and executable by a processor. Illustrative processors include a computer system's central processing unit and/or graphical processing unit.

DETAILED DESCRIPTION

The present invention provides a method, system, and computer program product for generating digital images having spatially varying effects. The following description is presented to enable any person skilled in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

Figure 1:
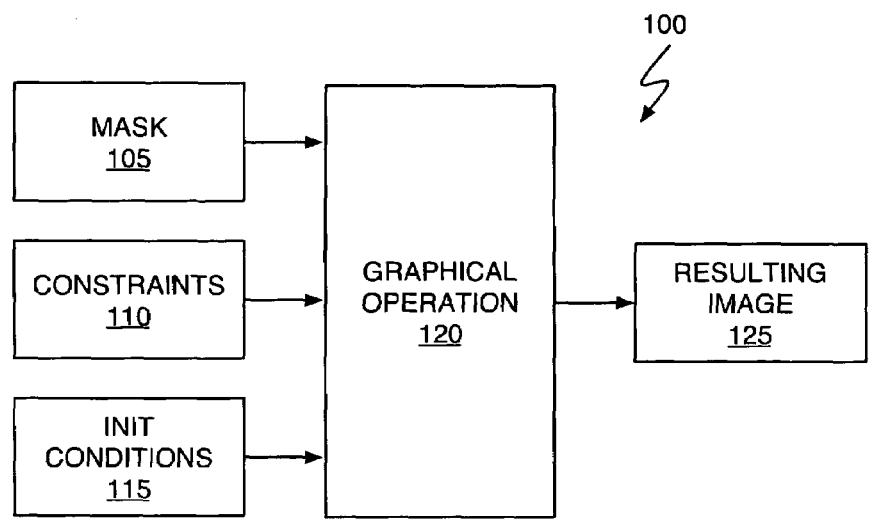
FIG. 1 shows, in block diagram form, the inputs to a graphical operation in accordance with one embodiment of the invention.

Referring to FIG. 1, technique 100 in accordance with one embodiment of the invention takes as input mask 105, boundary constraints 110 and initial conditions 115. With these inputs, a series of graphical operations 120 are performed (see discussion below) to generate resulting image 125. In general, graphic operation 120 blends constraint values 110 and initial conditions 115 using mask 105 to produce values (within the region defined by mask 105) that are continuous at the mask's boundaries and that match the specified constraint values at the mask's boundaries. Such an operation can generate stunning visual effects with little user input and/or refinement and in a computationally efficient manner.

Figure 2A:
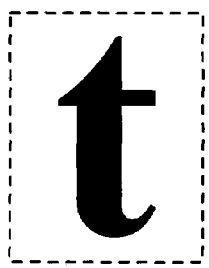
FIG. 2 shows illustrative masks.
Figure 2B:
Figure 2C:
Figure 2D:
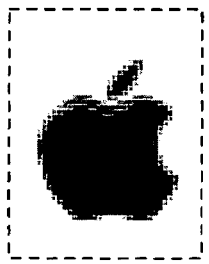
Figure 2E:
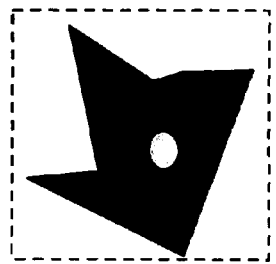
Figure 2F:
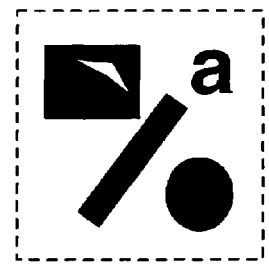

As used herein, mask 105 comprises an arbitrary two-dimensional (2D) scalar field whose values define one or more "inside" regions, one or more "outside" regions and "boundaries" between the inside and outside regions. For example, mask 105 could use a value representing '1' to identify inside regions (e.g., the binary value 11111111), a value representing '0' to identify outside regions (e.g., the binary value 00000000) and values representing values between 1 and 0 to identify boundaries. Accordingly, mask 105 may define an area that has zero or more hard edges, zero or more soft edges or a combination of hard and soft edges. Mask 105 may also be an anti-aliased scan conversion of a geometric outline(s). Illustrative masks include, but are not limited to, a single character (e.g., FIG. 2A), a plurality of characters such as a word (e.g., FIG. 2B), well-known geometric shapes (e.g., FIGS. 2C and 2D) and arbitrary geometric shapes (FIGS. 2E and 2F).

As used herein, constraints 110 comprise arbitrary 2D scalar or vector field values that correspond to those areas defined by mask 105 that are not completely within the mask's "inside" region. Thus, constraints 110 comprise values corresponding to mask 105's outside regions and boundaries. Illustrative scalar values include values representing height and potential. Illustrative vector values include values representing color and velocity (i.e., directional motion).

As used herein, initial conditions 115 comprise arbitrary 2D scalar or vector field values that correspond to those areas defined by mask 105 that are not completely within the mask's "outside" region. Thus, initial conditions 115 comprise values corresponding to mask 105's inside regions and boundaries. It will be recognized that in any given implementation, constraint values 110 and initial conditions 115 are of the same data type—each must be either a scalar field or a vector field.

Figure 3:
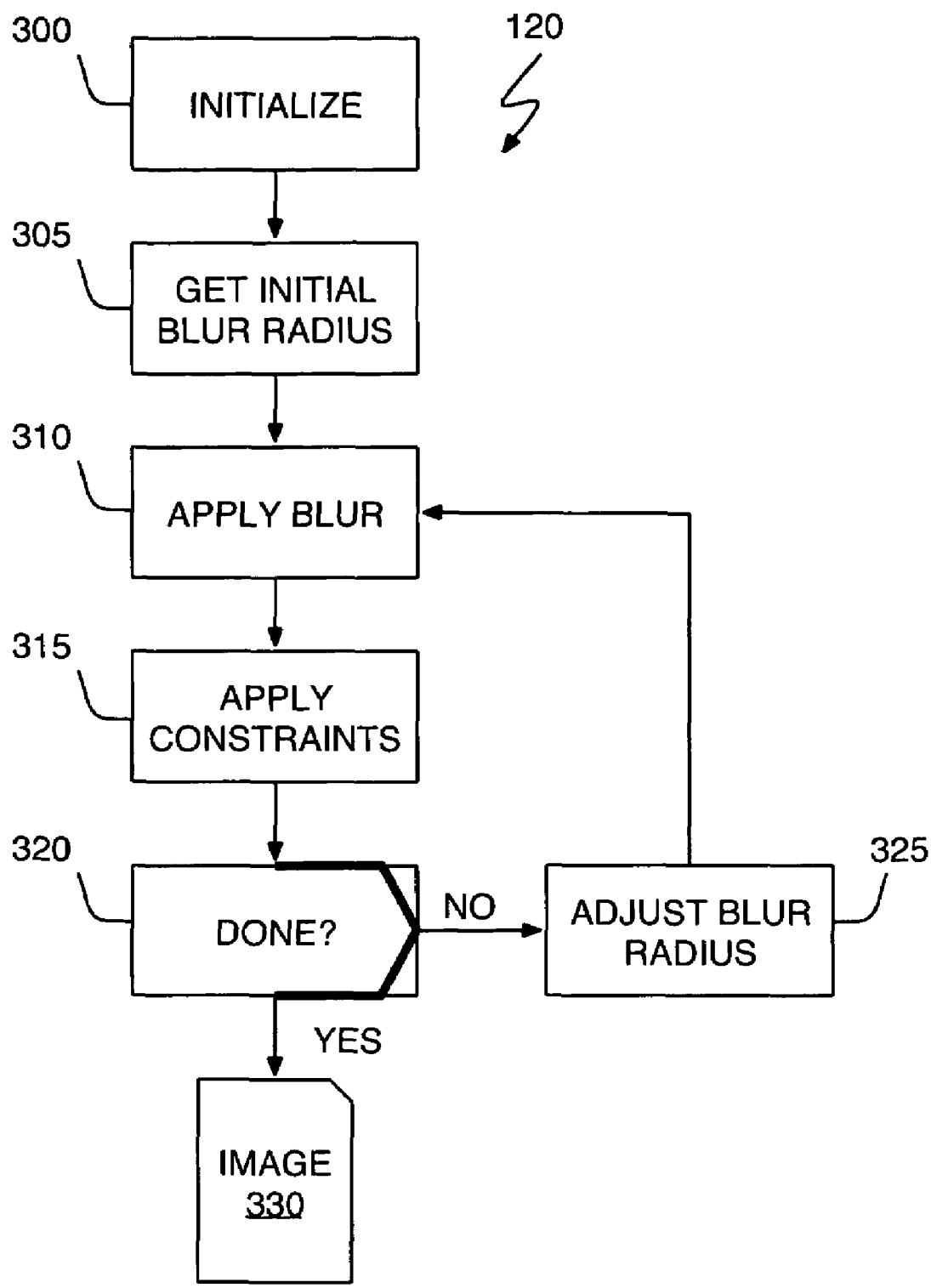
FIG. 3 shows, in flowchart form, a graphical operation in accordance with one embodiment of the invention.
Figure 4:
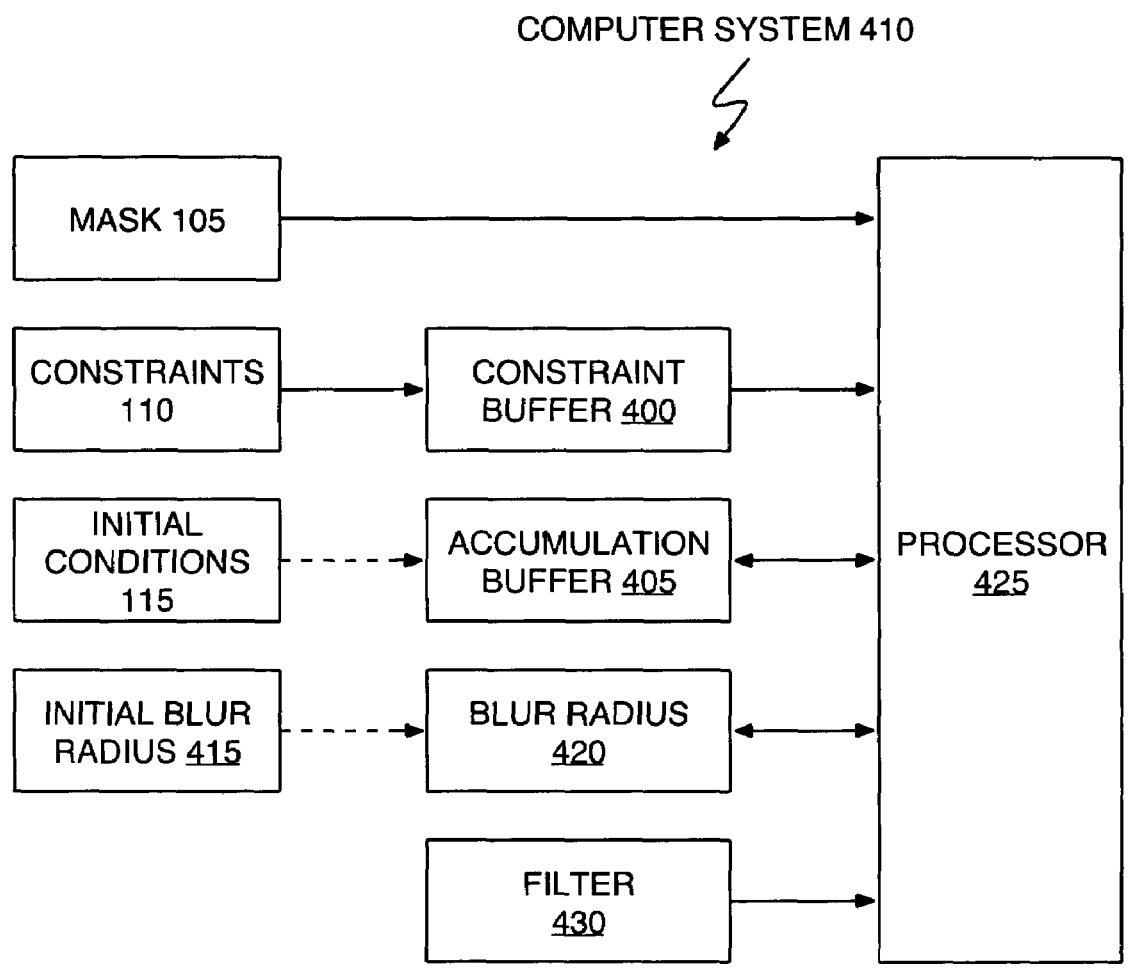
FIG. 4 shows, in block diagram form, a system for performing the acts of FIG. 3.

Referring to FIG. 3, graphic operation 120 in accordance with one embodiment of the invention begins by initializing data structures used to represent mask 105, constraints 110 and initial conditions 115 (block 300). Referring to FIG. 4, for example, constraints 110 (i.e., constraint values) are loaded into constraint buffer 400 and initial conditions 115 (i.e., initial condition values) are loaded into accumulation buffer 405 of computer system 410. Next, an initial blur radius value is determined (block 305). It has been found that an initial blur radius value equal to the maximum width of any contiguous "inside" region defined by mask 105 generally provides visually pleasing results. For example, if mask 105 defines a circular region, the initial blur radius value would be set to the circle's diameter. If mask 105 defines a square region, the initial blur radius value would be set to the square's edge length. If mask 105 defines a text region, the initial blur radius value would be set to the width of the thickest body stem. In another embodiment, the initial blur radius is set to a value greater than the maximum width of any contiguous mask area by a specified factor (e.g., by a factor of 1.25), but less than the maximum width of mask 105. In yet another embodiment, the initial blur radius is set to a value less than the maximum width of any contiguous mask area by a specified factor (e.g., by a factor of 0.8). As shown in FIG. 4, initial blur radius value 415 is assigned to method variable blur radius 420. (In FIG. 4, the dashed lines represent the one-time use of information.)

Referring again to FIGS. 3 and 4, following the acts of blocks 305, processor 425 filters the contents of accumulation buffer 405 using a specified filter 430 and the (initial) blur radius value, returning the result to accumulation buffer 405 (block 310). Next, processor 425 uses mask 105 and constraint values 110 stored in constraint buffer 400 to force all values in accumulation buffer 405 not corresponding to mask 105's inside region to a specified value (block 315). That is, all those values in accumulation buffer 405 corresponding to mask 105's outside region are set to their corresponding constraint buffer value and all those values in accumulation buffer 405 corresponding to mask 105's boundary region are set to a value between their current value and their corresponding constraint buffer value. In one embodiment, interpolation (e.g., linear interpolation) is used to determine accumulation buffer values corresponding to mask 105's boundary region. If the current blur radius value 420 is not less than a specified value such as, for example, one pixel (the "No" prong of block 320), current blur radius 420 is adjusted (block 325) and the acts in accordance with blocks 310-320 are repeated. It will be noted that the specified value (or other criteria against which the current blur radius is compared during the acts of block 320) may be a value set prior to beginning graphical operations 120 or it may be determined programmatically during execution of graphical operations 120. If the current blur radius value is less than or equal to a specified value (the "Yes" prong of block 320), processor 425 extracts from accumulation buffer 405 those values corresponding to mask 105 (inside and boundary regions) to generate final image 330.

Illustrative filters include, but are not limited to, Gaussian, box, Sinc and Lanczos filters. In one embodiment, blur radius value 420 is monotonically decreased each time the acts of block 325 are performed. For example, the blur radius may be reduced by a factor of 0.7, 0.5 or 0.3. It is noted that in the special case when blur radius value 420 is reduced by one-half (i.e., a factor of 0.5) in accordance with block 325, graphic operation 120 repeats the acts of blocks 310–325 approximately $\log_2$(initial blur radius÷final blur radius) times.

By way of example, technique 120 in accordance with FIG. 3 can use an arbitrary anti-aliased region such as text (defined by mask 105) to compute a height field that is continuous, continuously differentiable and zero-valued at the region's boundary. Such a height field may be used for automatically shading two-dimensional outlines very rapidly and without large amounts of hand-editing. Further, the resulting visual effect can be quite striking.

In another embodiment, technique 120 may be described in terms of electrical-type filtering operations. In these embodiments filter 430 would be another low pass filter, initial blur radius 415 would be the low pass filter's initial cut-off frequency and acts in accordance with block 325 would monotonically increase the filter's cut-off frequency. The operation could be halted (block 320) when the low pass filter's cut-off frequency met or exceeded the frequency of the pixel grid.

Various changes in the components, circuit elements, as well as in the details of the illustrated operational methods are possible without departing from the scope of the following claims. For instance, the illustrative system of FIG. 4, processor 410 may be a computer system's central processing unit, a graphics processing unit, a digital signal processor, a vector processing unit or a combination of these types of processors. Similarly, constraint and accumulation buffers may be implemented using general purpose memory (e.g., system random access memory), special purpose memory (e.g., memory allocated for graphic operations and/or graphical processors) or dedicated hardware registers. One of ordinary skill in the art will also recognize that the acts of block 310 may be performed using a family of filters rather than a single as described above. For example, a family of filters that have large exponential profiles at large blur radii and steeper profiles at smaller blur radii may also be used. In addition, acts in accordance with FIG. 3 may be performed by a programmable control device executing instructions organized into one or more program modules. A programmable control device may be a single computer processor, a special purpose processor (e.g., a digital signal processor, a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

What is claimed is:

1. A graphic design method, comprising:
    receiving a mask comprising elements representing one or more inside regions, one or more outside regions and one or more boundaries, each mask element having a scalar value;
    receiving a constraint comprising elements corresponding to the one or more boundary regions and elements corresponding to the one or more outside regions, each constraint element having a value;

receiving initial values for each element corresponding to the one or more inside regions and the one or more boundary regions;

combining the constraint and the initial values using the mask into an accumulator, the accumulator having elements corresponding to the inside region and the boundary region, each accumulator element having a value;

blurring accumulator values in accordance with a blur radius value;

depositing the constraint into the accumulator using the mask;

checking if the blur radius satisfies a specified criteria and, if it does, outputting those values from the accumulator corresponding to the inside and boundary regions, else adjusting the blur radius value and repeating the acts of blurring, depositing and checking;

using the outputted values to adjust a display characteristic of an object; and displaying the object.

2. The method of claim 1, wherein each mask element value comprises a gray scale value.

3. The method of claim 2, wherein each mask element value representing an inside region has a first scalar value, each mask element value representing an outside region has a second scalar value and each mask element value representing a boundary region has a value between the first and second scalar values.

4. The method of claim 3, the first scalar value represents a value of 1and the second scalar value represents a value of 0.

5. The method of claim 1, wherein each constraint element value comprises a scalar value.

6. The method of claim 5, wherein each scalar value represents a height value.

7. The method of claim 5, wherein each initial value comprises a scalar value.

8. The method of claim 5, wherein each accumulator element value comprises a scalar value.

9. The method of claim 1, wherein each constraint element value comprises a vector value.

10. The method of claim 9, wherein each vector value represents a color value.

11. The method of claim 9, wherein each initial value comprises a vector value.

12. The method of claim 9, wherein each accumulator element value comprises a vector value.

13. The method of claim 1, wherein the act of blurring is preceded by the act of determining an initial blur radius value.

14. The method of claim 13, wherein the act of determining an initial blur radius comprises:

determining a maximum width of any one of the one or more inside regions; and setting the initial blur radius value to a value proportional to the determined maximum width.

15. The method of claim 1, wherein the Accumulator further comprises values corresponding to the one or more outside regions.

16. The method of claim 15, wherein the act of combining comprises, for each accumulator element:

setting the accumulator element value to the corresponding initial condition value if the accumulator element corresponds to an inside region;

setting the accumulator element value to the corresponding constraint element value if the accumulator element corresponds to an outside region; and setting the accumulator element value to an interpolated value between the corresponding initial condition value and the corresponding constraint element value if the accumulator element corresponds to a boundary region.

17. The method of claim 16, wherein the act of setting the accumulator element value to an interpolated value comprises the act of linearly interpolating.

18. The method of claim 1, wherein the act of blurring comprises applying a blur filter to the accumulator values.

19. The method of claim 18, wherein the act of applying a blur filter comprises applying a Gaussian filter.

20. The method of claim 18, wherein the act of applying a blur filter comprises applying a filter selected from the group consisting of box filters, blurring convolutions, Sinc filters and Lanczos filters.

21. The method of claim 18, wherein the act of applying a blur filter comprises applying a plurality of blur filters, wherein one of said plurality of blur filters is applied for each iteration through the acts of blurring, depositing, adjusting and checking.

22. The method of claim 1, wherein the act of depositing comprises:

changing accumulator element values corresponding to an outside region to their corresponding constraint element value; and interpolating a value between the accumulator element value and the constraint element value for each accumulator element corresponding to a boundary region.

23. The method of claim 22, wherein the act of interpolating comprises the act of linearly interpolating.

24. The method of claim 1, wherein the act of adjusting comprises monotonically reducing the blur radius value.

25. The method of claim 24, wherein the act of monotonically reducing the blur radius value comprises multiplying the blur radius by a value greater than 0 and less than 1.

26. The method of claim 1, wherein the act of checking comprises determining if the adjusted blur radius is greater than a value representing one pixel.

27. The method of claim 1, wherein the act of checking comprises determining if the blur radius is grater than a specified value.

28. The method of claim 27, wherein the specified value is a programmatically determined value.

29. A graphic design method, comprising:

receiving a mask comprising a first portion of elements representing an inside region, a second portion of elements representing an outside region and a third portion of elements representing a boundary region, each mask element having a value;

receiving a constraint comprising a first portion of elements corresponding to the boundary region and a second portion of elements corresponding to the outside region, each constraint element having a value;

receiving an initial value comprising a first portion of elements corresponding to the boundary region and a second portion of elements corresponding to the inside region, each initial value element having a value;

determining an initial blur radius value;

combining the constraint and the initial value using the mask into an accumulator, the accumulator having a plurality of elements a first portion of which correspond to the inside region, a second portion of which correspond to the outside region and a third portion of which correspond to the boundary region, each accumulator element having a value;

blurring accumulator values in accordance with the blur radius value;

depositing the constraint into the accumulator using the mask;

checking if the adjusted blur radius value is below a specified value and, if it is, stopping, else adjusting the blur radius value and repeating the acts of blurring, depositing and checking;

using the accumulator values to adjust a display characteristic of an object; and displaying the object.

30. The method of claim 29, further comprising extracting those elements from the accumulator corresponding to the inside and boundary regions.

31. The method of claim 29, further comprising removing those elements from the accumulator corresponding to the outside region.

32. The method of claim 29, wherein the mask comprises an arbitrary two-dimensional scalar field.

33. The method of claim 32, wherein each mask element value comprises a gray scale value.

34. The method of claim 32, wherein each element representing the inside region has a first scalar value, each element representing the outside region has a second scalar value and each element representing the boundary region has a value between the first and second scalar values.

35. The method of claim 34, the first scalar value represents a value of 1 and the second scalar value represents a value of 0.

36. The method of claim 29, wherein the mask comprises values generated from an anti-aliased scan conversion of one or more geometric outlines.

37. The method of claim 29, wherein the constraint comprises an arbitrary two-dimensional field.

38. The method of claim 37, wherein each element in the constraint comprises a scalar value or a vector value.

39. The method of claim 38, wherein each scalar value represents a height value.

40. The method of claim 38, wherein a vector value comprises a color value.

41. The method of claim 29, wherein each element in the initial value comprises a scalar value or a vector value.

42. The method of claim 29, wherein the initial blur radius value is proportional to a maximum width of the inside region.

43. The method of claim 29, wherein the act of combining comprises, for each accumulator element:

setting the accumulator element value to the corresponding initial condition value if the accumulator element corresponds to the inside region;

setting the accumulator element value to the corresponding constraint element value if the accumulator element corresponds to the outside region; and setting the accumulator element value to an interpolated value between the corresponding initial condition value and the corresponding constraint element value if the accumulator element corresponds to the boundary region.

44. The method of claim 43, wherein the act of setting the accumulator element value to an interpolated value comprises the act of linearly interpolating.

45. The method of claim 29, wherein the act of blurring comprises applying a blur filter to the accumulator values.

46. The method of claim 45, wherein the act of applying a blur filter comprises applying a Gaussian filter.

47. The method of claim 45, wherein the act of applying a blur filter comprises applying a filter selected from the group consisting of box filters, blurring convolutions, Sinc filters and Lanczos filters.

48. The method of claim 45, wherein the act of applying a blur filter comprises applying a plurality of blur filters, wherein one of said plurality of blur filters is applied for each iteration through the acts of blurring, depositing, adjusting and checking.

49. The method of claim 29, wherein the act of depositing comprises:

changing accumulator element values corresponding to the outside region to their corresponding constraint element value; and interpolating a value between the accumulator element value and the constraint element value for each accumulator element corresponding to the boundary region.

50. The method of claim 49, wherein the act of interpolating comprises the act of linearly interpolating.

51. The method of claim 29, wherein the act of adjusting comprises monotonically reducing the blur radius value.

52. The method of claim 51, wherein the act of monotonically reducing the blur radius value comprises multiplying the blur radius by a value greater than 0 and less than 1.

53. The method of claim 51, wherein the act of monotonically reducing the blur radius value comprises reducing the blur radius value by approximately one-half.

54. The method of claim 51, wherein the specified value comprises a value representing a single pixel element.

55. The method of claim 29, wherein the mask comprises a plurality of discontinuous inside regions.

56. The method of claim 29, wherein the mask comprises a scalar representation of one or more characters.

57. The method of claim 55, wherein the initial blur radius value is proportional to a maximum width of any of the plurality of discontinuous inside regions.

58. A graphic design method, comprising:

receiving a mask comprising a first portion of scalar valued elements representing an inside region, a second portion of scalar valued elements representing an outside region and a third portion of scalar valued elements representing a boundary region;

receiving a constraint comprising a first portion of elements corresponding to the boundary region and a second portion of elements corresponding to the outside region, each constraint element having a value;

receiving an initial value comprising a first portion of elements corresponding to the boundary region and a second portion of elements corresponding to the inside region, each initial value element having a value;

determining an initial cut-off frequency value;

combining the constraint and the initial value using the mask into an accumulator, the accumulator having a plurality of elements a first portion of which correspond to the inside region, a second portion of which correspond to the outside region and a third portion of which correspond to the boundary region, each accumulator element having a value;

blurring accumulator values in accordance with the cut-off frequency value;

depositing the constraint into the accumulator using the mask;

adjusting the cut-off frequency value;

checking if the adjusted cut-off frequency value is above a specified value and, if it is, using the accumulator values to adjust a display characteristic of an object, and displaying the object, else repeating the acts of blurring, depositing, adjusting and checking.

59. The method of claim 58, wherein the act of blurring comprises filtering the accumulator values with a low pass filter, the low pass filter having a cut-off frequency.

60. The method of claim 59, wherein the act of adjusting comprises monotonically increasing the cut-off frequency.

61. The method of claim 60, wherein the act of increasing the cut-off frequency comprises doubling the cut-off frequency.

62. The method of claim 59, wherein the specified value comprises a Nyquist frequency associated with the mask.

63. A program storage device, readable by a programmable control device, comprising instructions stored on the program storage device for causing the programmable control device to perform the acts set forth in any one of claims 1–26.

64. A program storage device, readable by a programmable control device, comprising instructions stored on the program storage device for causing the programmable control device to perform the acts set forth in any one of claims 29–57.

65. A program storage device, readable by a programmable control device, comprising instructions stored on the program storage device for causing the programmable control device to perform the acts set forth in any one of claims 58–62.

66. A computer system, comprising:
a display device;
one or more input devices;
a processor operatively coupled to the display and input devices; and
memory operatively coupled to the processor, input and display devices, said memory adapted to store instructions executable by the processor in accordance with any one of claims 1–26.

67. The computer system of claim 66, wherein the processor comprises one or more central processing units associated with computer system.

68. The computer system of claim 66, wherein the processor comprises one or more graphical processing units associated with computer system.

69. The computer system of claim 66, wherein the processor comprises at least one or central processing unit associated with the computer system and at least one graphical processing unit associated with computer system.

70. A graphic design device, including:
a mask comprising elements representing one or more inside regions, one or more outside regions and one or more boundaries, each mask element having a scalar value;
a constraint comprising elements corresponding to the one or more boundary regions and elements corresponding to the one or more outside regions, each constraint element having a value;
initial values for each element corresponding to the one or more inside regions and the one or more boundary regions;
an initial blur radius value;
means for combining the constraint and the initial values using the mask into an accumulator, the accumulator having elements corresponding to the inside region, the outside region and the boundary region, each accumulator element having a value;
means for blurring accumulator values in accordance with the blur radius value;
means for depositing the constraint into the accumulator using the mask; and
means for checking if the blur radius is above a specified value and, if it is, for adjusting the blur radius value and invoking the means for combining, blurring and checking, else
output means for outputting those values from the accumulator corresponding to the inside and boundary regions;
using the outputted values to adjust a display characteristic of an object; and
displaying the object.

71. The device of claim 70, wherein the means for combining comprises one or more of the following computational elements: a central processor, a graphics processor, a programmable graphics processor and a digital signal processor.

72. The device of claim 70, wherein the means for blurring comprises one or more of the following computational elements: a central processor, a graphics processor, a programmable graphics processor and a digital signal processor.

73. The device of claim 70, wherein the means for depositing comprises one or more of the following computational elements: a central processor, a graphics processor, a programmable graphics processor and a digital signal processor.

74. The device of claim 70, wherein the constraint, the initial values and the accumulator comprise elements having a type selected from the group consisting of: scalars and vectors.

75. The device of claim 70, wherein the initial blur radius value comprises the maximum width of any one of the one or more inside regions associated with the mask.

76. The device of claim 70, wherein the means for depositing comprises performing the following acts:
changing accumulator element values corresponding to an outside region to their corresponding constraint element value; and
interpolating a value between the accumulator element value and the constraint element value for each accumulator element corresponding to a boundary region.

77. The device of claim 70, wherein adjusting the blur radius value comprises monotonically reducing the blur radius value.

78. A graphic design method, comprising:
receiving a first object defining one or more closed regions;
initializing a result object, said result object corresponding to one or more inside regions and one or more boundary regions;
blurring the contents of the result object in accordance with a blur radius value;
conforming the result object in accordance with the first object and one or more specified constraints; and
checking if the blur radius value satisfies a specified criteria and, if it does, outputting contents from the result object corresponding to the one or more inside and one or more boundary regions, else adjusting the blur radius value and repeating the acts of blurring, conforming and checking;

using the outputted contents to adjust a display characteristic of an object; and displaying the object.

79. The method of claim 78, wherein the act of initializing comprises using the first object to combine constraint values and initial values into the result object.

80. The method of claim 78, wherein the act of blurring comprises applying a blur filter to the result object.

81. The method of claim 78, wherein the act of conforming comprises:

changing contents of the result object corresponding to an outside region to a corresponding constraint value; and changing contents of the result object corresponding to a boundary region to a value between the result object content and a corresponding boundary region constraint value.

82. The method of claim 81, wherein the act of changing contents of the result object corresponding to a boundary region comprises interpolating a value between the result object content and a corresponding boundary region constraint value.

83. The method of claim 78, wherein the act of checking if the blur radius satisfies a specified criteria comprises determining whether the blur radius is above a threshold value.

84. The method of claim 83, wherein the threshold value is a programmatically determined value.

85. The method of claim 83, wherein the threshold value is a predetermined value.

86. The method of claim 78, wherein the act of adjusting comprises monotonically reducing the blur radius by a specified amount.

87. The method of claim 86, wherein the threshold value is a programmatically determined value.

88. A program storage device, readable by a programmable control device, comprising instructions stored on the program storage device for causing the programmable control device to perform the acts set forth in any one of claims 78–87.

89. A graphic design method, comprising:

blurring contents of a result object in accordance with a blur radius value, the result object having contents corresponding to one or more inside regions and one or more boundary regions;

conforming the result object in accordance with a first object and one or more specified constraints, the first object defining one or more closed regions;

checking if the blur radius value satisfies a specified criteria and, if it does, outputting the contents of the result object corresponding to the one or more inside regions and the one or more boundary regions, else adjusting the blur radius value and repeating the acts of blurring, conforming and checking;

using the outputted contents to adjust a display characteristic of an object; and displaying the object.

90. The method of claim 89, wherein the act of blurring comprises applying a blur filter to the result object.

91. The method of claim 89, wherein the act of conforming comprises:

changing contents of the result object corresponding to an outside region to a corresponding constraint value; and changing contents of the result object corresponding to a boundary region to a value between the result object content and a corresponding boundary region constraint value.

92. The method of claim 91, wherein the act of changing contents of the result object corresponding to a boundary region comprises interpolating a value between the result object content and a corresponding boundary region constraint value.

93. The method of claim 89, wherein the act of checking if the blur radius satisfies a specified criteria comprises determining whether the blur radius is above a threshold value.

94. The method of claim 93, wherein the threshold value is a programmatically determined value.

95. The method of claim 93, wherein the threshold value is a predetermined value.

96. The method of claim 89, wherein the act of adjusting comprises monotonically reducing the blur radius by a specified amount.

97. The method of claim 96, wherein the act of monotonically reducing the blur radius value comprises reducing the blur radius value by a programmatically determined value.

98. The method of claim 96, wherein the act of monotonically reducing the blur radius value comprises reducing the blur radius value by a predetermined value.

99. A program storage device, readable by a programmable control device, comprising instructions stored on the program storage device for causing the programmable control device to perform the acts set forth in any one of claims 89–98.

\* \* \* \* \*